(12) United States Patent    (10) Patent No.:    US 6,364,176 B1
Kilian                       (45) Date of Patent:   Apr. 2, 2002

(54) DISPENSING LID

(75) Inventor: Michael Kilian, Western Australia (AU)

(73) Assignee: Oil Safe Systems PTY LTD, Canning Vale (AU)

(*) Notice: Subject to any disclaimer, the term of this patent is extended or adjusted under 35 U.S.C. 154(b) by 0 days.

(21) Appl. No.: 09/398,247

(22) Filed: Sep. 17, 1999

(30) Foreign Application Priority Data

Sep. 17, 1998 (AU) .............................................. PP 6003

(51) Int. Cl.⁷ .............................................. B65D 83/00
(52) U.S. Cl. ..................... 222/468; 222/481.5; 222/482; 222/521; 239/457; 239/539
(58) Field of Search ................................. 222/521, 520, 222/519, 468, 470, 481, 481.5, 482, 478, 479; 239/451, 457, 456, 537, 538, 539, 540, 541

(56)           References Cited

U.S. PATENT DOCUMENTS

| 442,638   | A | * | 12/1890  | Raleigh   |
|-----------|---|---|----------|-----------|
| 705,160   | A | * | 7/1902   | Swanson   |
| 1,072,588 | A | * | 9/1913   | Duncan    |
| 1,357,024 | A | * | 10/1920  | Behrman   |
| 1,373,244 | A | * | 3/1921   | Hernandez |
| 1,771,106 | A | * | 7/1930   | Wright    |
| 1,904,739 | A | * | 4/1933   | Kroen     |
| 2,254,164 | A | * | 8/1941   | Bernhardt |
| 2,306,550 | A | * | 12/1942  | Mailey    |
| 2,799,437 | A | * | 7/1957   | Jepson    |
| 3,278,096 | A | * | 10/1966  | Miller    |
| 4,069,946 | A | * | 1/1978   | Flider    |
| 4,746,036 | A |   | 5/1988   | Messner ...................... 222/484 |
| 5,000,360 | A | * | 3/1991   | Lown et al. |
| 5,405,058 | A |   | 4/1995   | Kalis et al. .................. 222/185 |
| 5,615,808 | A |   | 4/1997   | Huang ......................... 222/472 |
| 5,615,809 | A |   | 4/1997   | Feer et al. ................... 222/484 |

* cited by examiner

Primary Examiner—Lesley D. Morris
Assistant Examiner—Christopher S. Kim
(74) Attorney, Agent, or Firm—Michael Best & Friedrich LLP

(57) ABSTRACT

The dispensing lid 10 for the gravity feed dispensing of a liquid includes a main body 12 defining a cavity 14 and adapted, by a screw thread 16, for releasably attaching any lid 10 to the container in a sealing manner. Spout 18 extends from the main body 12 and is fitted with an adjustable discharge valve 20 for varying the rate at which liquid flows through the spout 18. Air bleed passage 22 is formed in the lid for enabling fluid communication between the cavity 14 and the external atmosphere. The lid 10 also includes a manually operable air bleed valve 24 for selectively opening and closing the air bleed passage 22. Air bleed valve 24 is biased to normally close the passage 22. When the lid 10 is attached to a container by the screw thread 16 liquid can be dispensed or poured through the spout 18 by action of gravity at a rate dependent on the position or state of both valves 20 and 24.

11 Claims, 4 Drawing Sheets

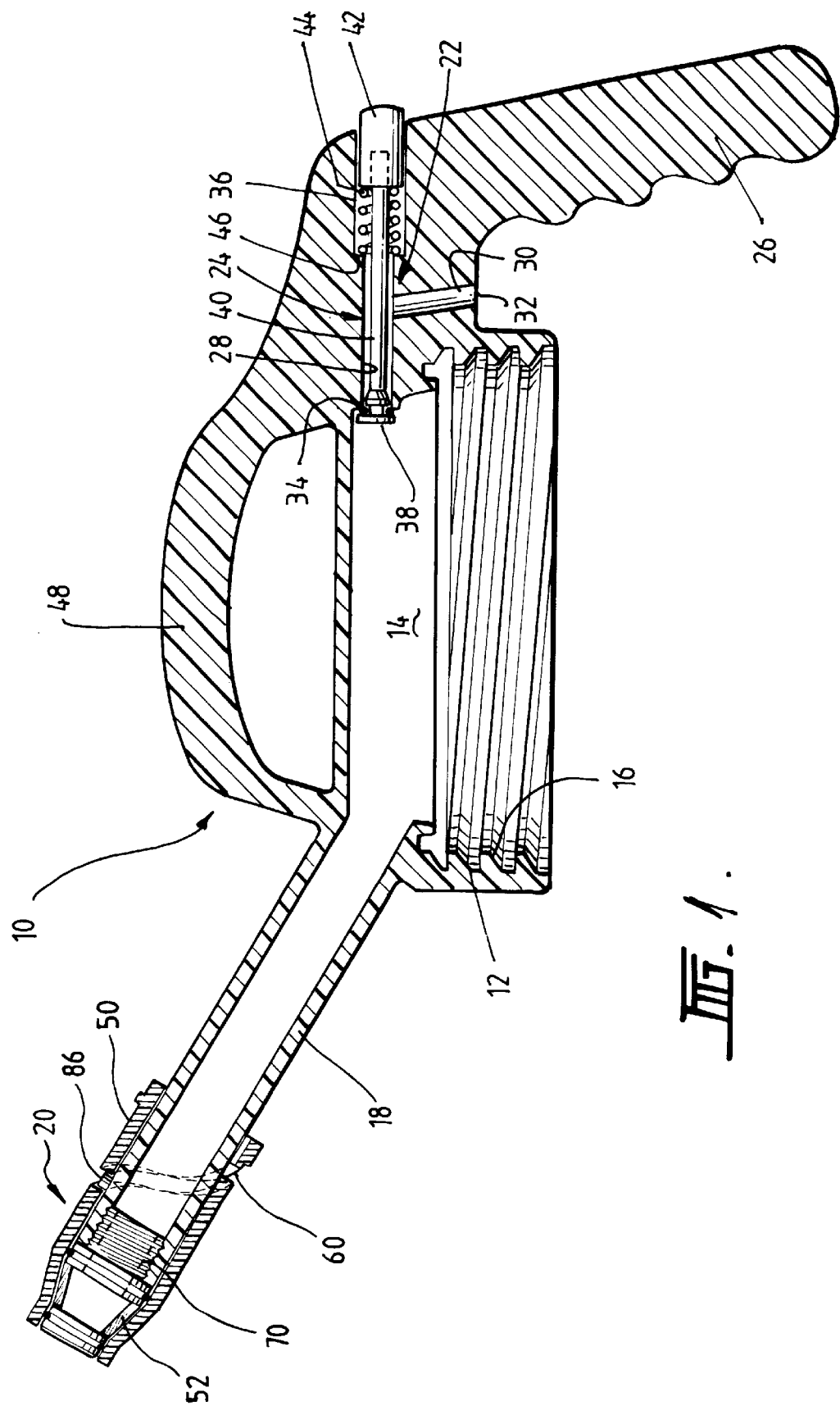

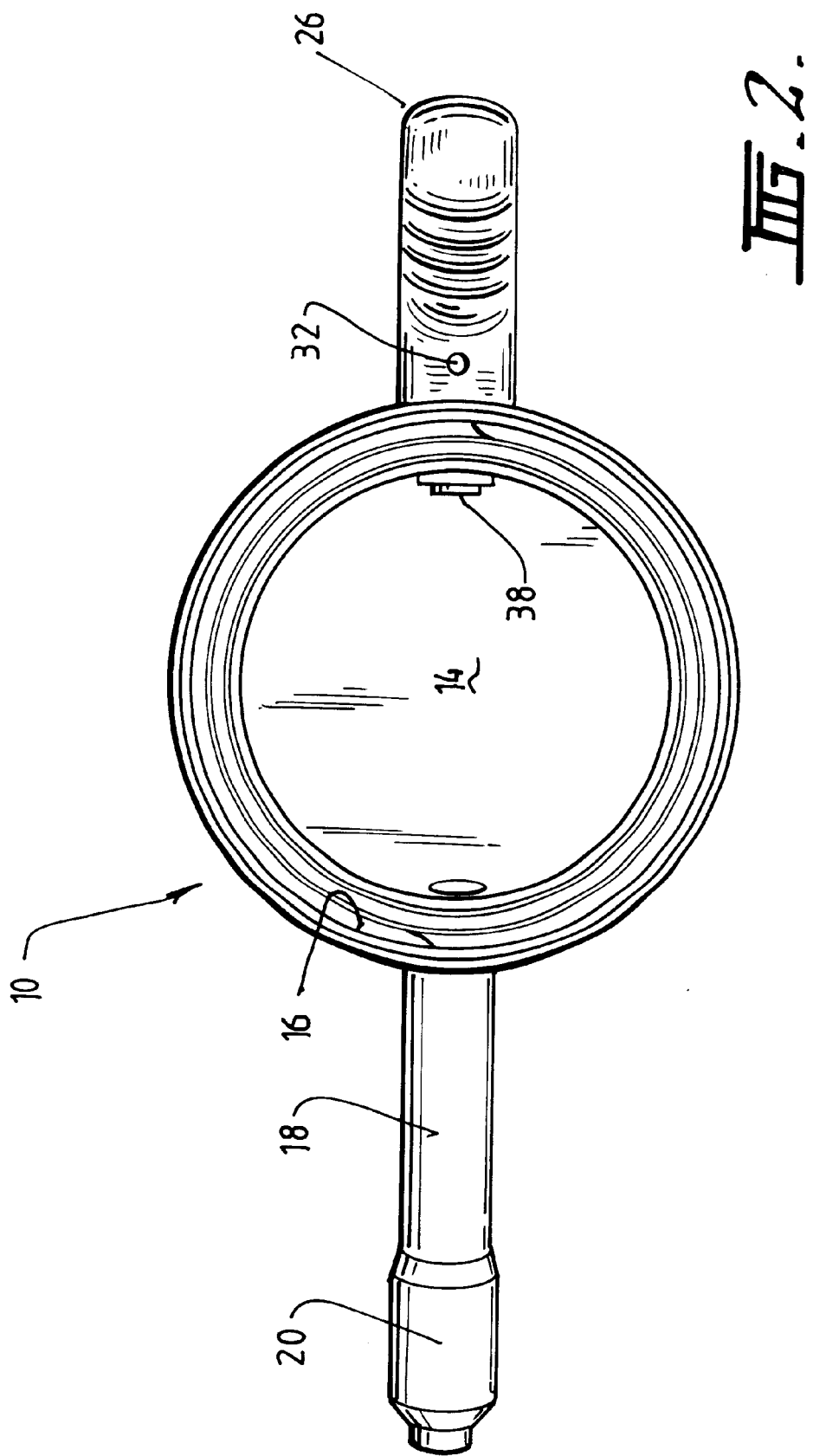

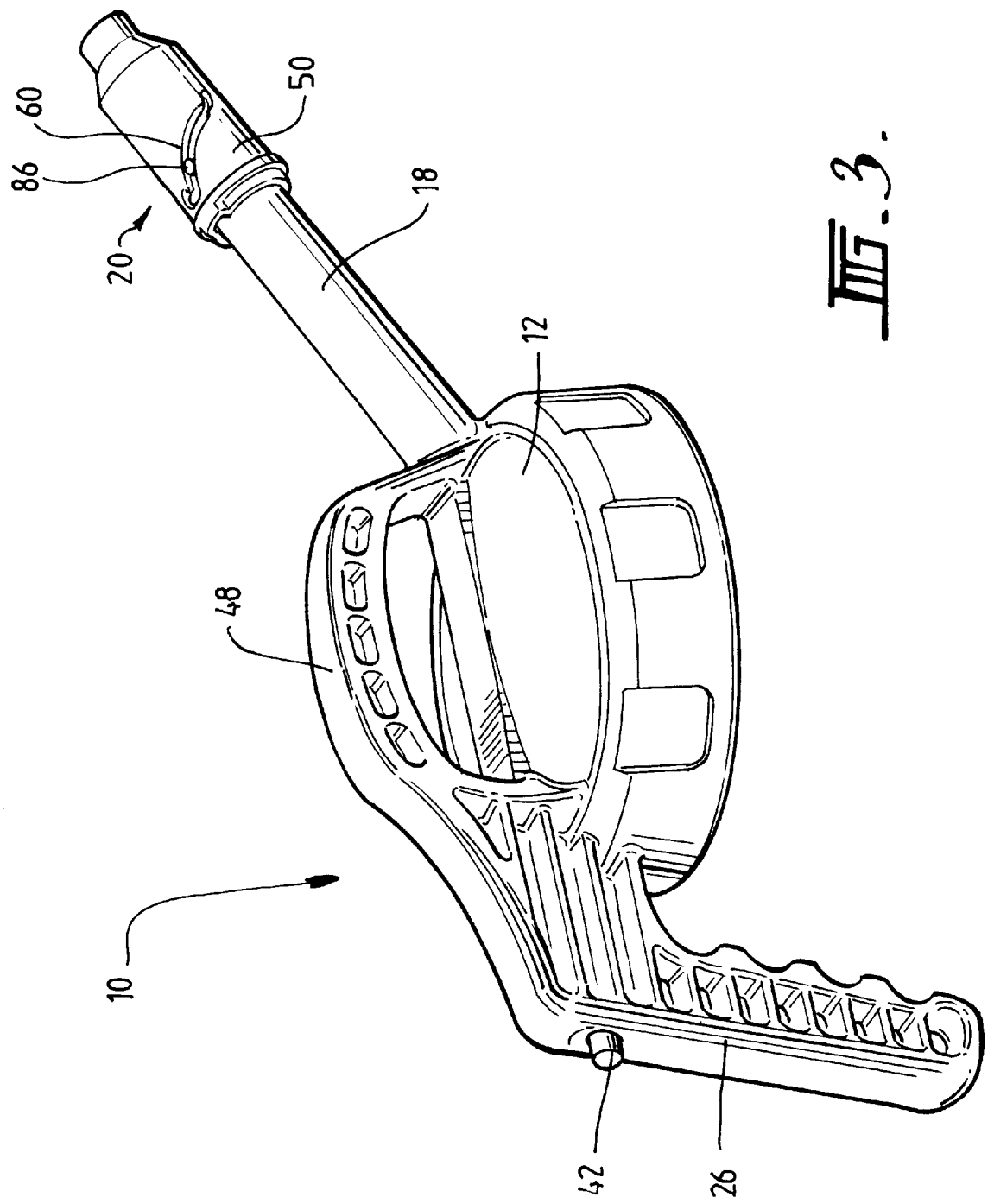

DISPENSING LID

FIELD OF THE INVENTION

The present Invention relates to a dispensing lid particularly, but not exclusively, for the gravity feed dispensing of a liquid from a container.

BACKGROUND OF THE INVENTION

It is known to form liquid dispensing containers with spouts or other openings for the gravity feed dispensing of a liquid. Examples of such containers include kettlos, watering cans and oil cans. Typically however such containers do not allow for the control of the dispensing rate other than by varying the angle at which the container is held. Also such containers, if accidentally knocked over will allow the liquid contained therein to escape. Invariably the spout is formed integrally with the body of the container. Therefore if a liquid that is required to be dispensed is in a different container that does not have a spout or other convenient dispensing mechanism one would need to transfer the liquid from the first container to the one having the dispensing mechanism to enable controlled dispensing of the liquid.

SUMMARY OF THE INVENTION

It is an object of the present invention to provide a dispensing lid that can be selectively coupled to a container to enable the controlled gravity feed dispensing of the liquid within that container.

According to the present invention there is provided a dispensing lid for the gravity feed dispensing of a liquid from a container, the lid including:

a main body defining a cavity and adapted for releasably attaching the lid to a container in a sealing manner;

a spout extending from the main body and having an adjustable discharge valve for varying the permissible flow rate of liquid through the spout;

an air bleed passage enable fluid communication between the cavity and the atmosphere; and, a manually operable air bleed valve for selectively opening and closing said air bleed passage, said air bleed valve being biased to a closed position that seals the air bleed passage; said discharge valve and air bleed valve being separately controllable;

whereby, in use, when said dispensing lid is attached to a liquid bearing container by said means, liquid can be dispensed through the spout by gravity at a rate controlled by the state or condition of the discharge valve and/or the air bleed valve.

Preferably the air bleed passage has a first opening that opens onto an undersurface of the lid.

Preferably the lid is provided with a handle so that when the lid is attached to a container the container can be carried and manipulated by the handle.

Preferably the air bleed passaged has a second opening that opens onto said cavity and said air bleed valve includes a seal normally biased to seal the second opening and connected with a manually operable actuator.

Preferably the seal is connected to the actuator via an elongate pin and the actuator is in the form of a button that can be depressed to open the seal against the bias to allow air to bleed into a container to which the lid is attached via the air bleed passage.

BRIEF DESCRIPTION OF THE DRAWINGS

An embodiment of the present invention will now be described by way of example only with reference to the accompanying drawings in which:

FIG. 1 is a cross sectional view of an embodiment of the present invention;

FIG. 2 is a bottom view of the lid shown in FIG. 1;

FIG. 3 is a perspective view of the lid shown in FIGS. 1 and 2;

DETAILED DESCRIPTION OF PREFERRED EMBODIMENTS

Figure 4A:
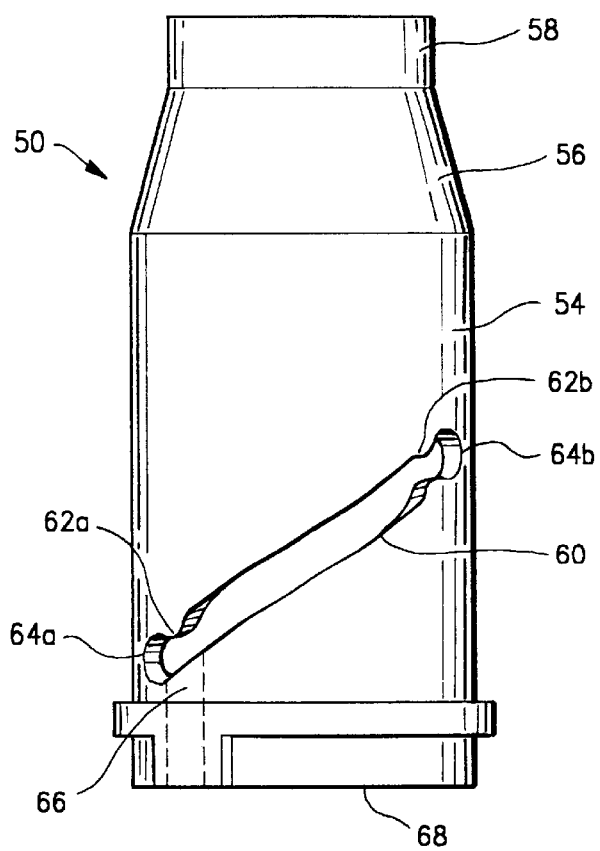
FIG. 4A is a side view of one pat of a dispensing valve of the lid shown in FIGS. 1 and 2.
Figure 4B:
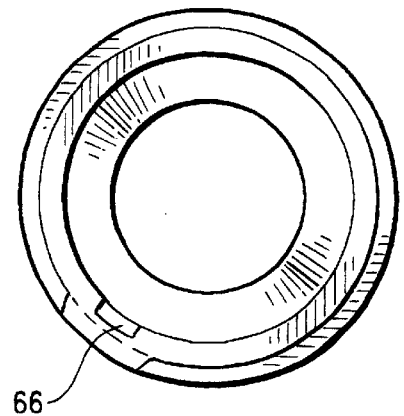
FIG. 4B is a bottom view of the first part of the valve shown in FIG. 4A.

Referring to the accompanying drawings, a dispensing lid 10 for the gravity feed dispensing of a liquid from a container (not shown) includes a main body 12 defining a cavity 14 and adapted, by means of a screw thread 16, for releasably attaching the lid 10 to the container in a sealing manner. A spout 18 extends from the main body 12 and is fitted with an adjustable discharge valve 20 for varying the rate at which liquid can flow through the spout 18. An air bleed passage 22 is formed in the lid for enabling fluid communication between the cavity 14 and the external atmosphere. The lid 10 also includes a manually operable air bleed valve 24 for selectively opening and closing the air bleed passage 22. The air bleed valve 24 is biased to normally close the passage 22 (as shown in FIG. 1). When in use, the lid 10 can be attached to a liquid bearing container by the screw thread 16 and liquid can be dispensed or poured through the spout 18 by action of gravity at a rate dependent on the position or state of the valves 20 and 24.

The lid 10 is formed with an integral handle 26 so that when the lid 10 is attached to a container the container can be carried and manipulated by the handle 26.

The air bleed passage 22 is T shaped having a substantially horizontal length 28 and an intersecting substantially vertical length 30, The length 28 and 30 are formed in and adjacent the handle 26. The passage 22 has a first opening 32 at a lower end of the vertical length 30 that opens onto an under surface of the lid 10. A second opening 34 of the passage 22 is provided at an inner most end of the horizontal length 28 adjacent the cavity 14. A portion 36 of the horizontal length 28 distant the opening 34 is formed with an increased diameter for housing components of the air bleed valve 24.

The air bleed valve 24 includes a seal 38 normally biased to seal the second opening 34 and connected via a pin or rod 40 to an actuator in the form of a push button 42, The push button 42 is located partially within the portion 36 of the horizontal length 28 and extends therefrom so that it can be operated by the hand gripping the handle 26 A spring 44 is also located within the portion 36 and abuts at opposite ends against the button 42 and a shoulder 46 caused by the step wise increase in diameter of the length 28 to form the portion 36. The spring 44 is preloaded so as to bias the seal 38 into a position to seal and close the opening 34.

A second carry handle 48 is integrally formed over the top of the body 12 to allow easy carrying the lid 10 and a container that may be attached thereto.

Figure 5A:
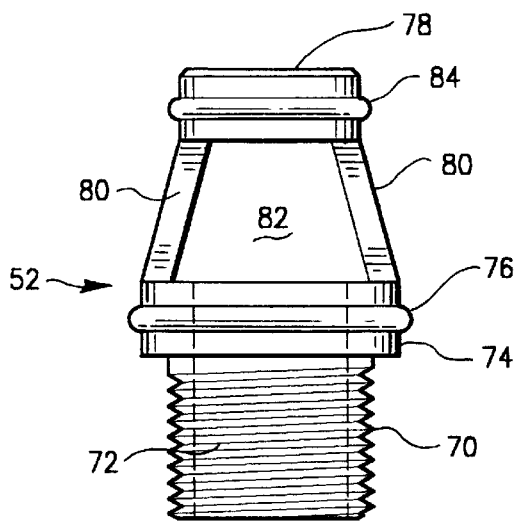
FIG. 5A is a side view of a second part of the dispensing valve of the lid shown in FIGS. 1 and 2; and, FIG. 5B is a bottom end view of the second part of the valve shown in FIG. 5A.
Figure 5B:
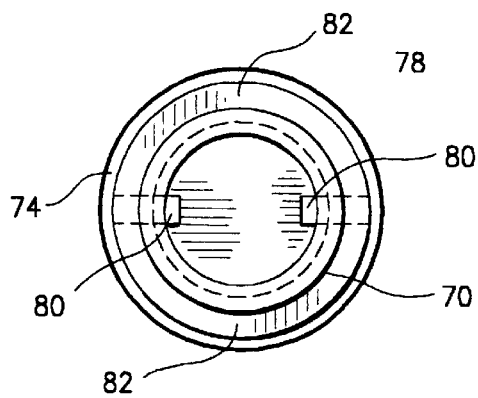

The valve 20 can be turned approximately 180° between a fully closed and a filly opened position to vary the size of the opening of the spout 18 and thus the flow rate of liquid that can be dispensed through the spout 18. The valve 20 includes a first part in the form of an outer sleeve 50 that is slidably retained on the outside of the spout 18 and a second part 52 (refer FIG. 1 and FIGS. 5A and 5B) that is attached by way of a screw coupling to an inside wall at the distal end of spout 18. Sleeve 50 has a cylindrical main body 54 of an inner diameter marginally greater than the outer diameter of the spout 18. Contiguously formed at one end of the main body 54 is a tapered portion 56 that reduces in diameter in a direction away from the spout 18. Formed contiguously with the tapered section 56 is a collar 58 of constant diameter. An inclined slot 60 or through slot is cut in the main body 54 and is provided at respective opposite ends with restrictions 62A and 62B leading to respective end seats 64A and 64B. An axially extending passage 66 is formed on an inside surface of the main body section 54 leading from a lower most edge 68 of the sleeve 50 into the slot 60. The through slot allows the pin to be viewed by the dispensing lid's user when the pin is positioned in the slot.

The second part 52 of the valve 20 has a lower portion 70 of constant diameter formed with a screw thread 72 for threadingly engaging a corresponding thread formed on the inside of the distal end of spout 18. At an upper end of lower portion 70 is a radially extending flange 74 provided with an annular groove for seating an O ring 76. Spaced centrally above the flange 74 is a solid disc shaped end 78. The end 78 is supported by a pair of inclined arms 80 that are formed integrally with flange 74 and end 78. The spacing of the flange 74 and end 78 forms an opening 82 for liquid travelling down the spout 18. The end 78 is also formed with an annular groove for scating a further O ring 84. A short upright pin 86 is formed on the spout 18 (see FIGS. 1 and 3) for location in the slot 60.

To fit the valve 20 to the spout 18, the second portion 52 is first screwed into the distal end of spout 18 and then the sleeve 50 is slipped onto the outside of the spout 18 with the passage 66 orientated to be in line with the pin 86. The height of the pin 86 is designed to be slightly greater than the height or clearance of the passage 66 so that a nominal force must be overcome in order to push the sleeve 50 backwardly over the pin 86 providing a snap type coupling once the pin 86 passes through passage 66 into the slot 60. In the fully closed position, the sleeve 50 is turned so that pin 86 passes through the restriction 62B and into the seat 64B. In this configuration, the O ring 74 bears against the inside of the main body 54 just below the commencement of the tapered section 56 and the O ring 84 boars against the inside of the collar 58. Thus, the opening 82 is effectively sealed preventing the dispensing of liquid from the spout 18. In order to move to the fully open positions the sleeve 50 is rotated on the shaft 18 in a clockwise direction. Due to the engagement of the pin 86 in the slot 60 this causes the sleeve 50 to move in the forward direction as it is rotated. This results in tho O ring 84 being spaced below the collar 58 and out of contact with the inside of sleeve 50 allowing liquid to be dispensed through the opening 82. The O ring 76 remains in contact with tho inside of the main body 54 preventing back flow of liquid between the main body 54 and spout 18 in the direction toward the lower edge 68, The valve 20 is releasably locked into the fully opened position by turning the sleeve 52 to the extent that the pin 86 is; forced through the restriction 62A and into the seat 64A. By varying the position of the pin 86 between the two seats 64A and 64B by rotation of sleeve 50 the degree of opening of the valve 20 can be adjusted.

The lid 10 can be releasbly attached to any liquid bearing container having a thread that can mate with the thread 16 formed in the body 12. Therefore the lid 10 can convert a standard container to u gravity feed liquid dispenser. The rate at which liquid can be dispensed can be controlled by the position or states of the valves 20 and 24. It will be appreciated that provided the lid 10 is attached to the container in the scaling manner then even if the valve 20 is open and the lid 10 and container is knocked over there will be no or minimal escape of liquid because the air bleed valve 24 will be automatically held shut. Consequently, there cannot be an equalisation of air pressure inside and outside of the container and therefore depending on how full the container originally was no or only a limited amount of liquid will be able to escape.

If the valve 20 is held at a particular position the dispensing rate for the liquid can be easily controlled by the hand gripping the handle 26 by varying thumb pressure on the push button 42 to thereby vary the degree of opening of the bleed passage 22. The lid 10 is particularly useful for incorporation into a liquid dispensing system comprising say a number of liquid containers formed with necks having a thread complimentary to the screw thread 16 and normally closed by way of screw caps. In such a system, the lid 10 can be screwed onto a container and used to dispense the liquid from that container Once the container is empty the lid 10 can be unscrewed from that container and screwed onto another full container.

From the above description it will be appreciated that embodiments of the lid 10 enables any container to be converted into u controllable gravity feed dispenser, with the lid allowing separate independent regulation of both liquid discharge and air bleeding.

Now that an embodiment of the Invention has been described in detail it will be apparent to those skilled in the relevant arts that numerous modifications and variations may be made without departing from the basic inventive concepts. For example, the lid 10 can be provided with any type of mating or fastening system for attaching to a container including a snap fitting, bayonet fitting or even a push or press fit. Further the means for attaching the lid to the container can be formed external of the cavity 14 rather than internal as shown in FIG. 1 Also, the first opening 32 of the air bleed passage can be formed at a location other than on an under surface of the lid 10. However this location is selected in the preferred embodiment as it decreases the likelihood of ingress of dirt or other foreign matter into the passage 22. All such modifications and variations together with others that would be obvious for a person of ordinary skill in the art are deemed to be within the scope of the present invention the nature of which is to be determined from the above description and the depended claims.

What is claimed is:

1. A dispensing lid for gravity feed dispensing of a liquid from a container, the lid comprising:
   a main body defining a cavity and having coupling means for releasably attaching the lid to the container;
   a spout extending from the main body, the spout having an outer surface on which is provided a pin and a discharge opening at a distal end;
   an adjustable discharge valve coupled to the spout for varying the flow rate of liquid through the spout, the adjustable discharge valve including
      a first part comprising a sleeve having a cylindrical main body with first and second opposite axial ends;
      a tapered portion continuous with the second axial end and reducing in diameter away from the first axial end, and a collar of constant diameter extending from and formed contiguously with the tapered portion, with an inclined slot formed in the cylindrical main body and in which said pin resides, the slot having an upper end axially spaced from the second axial end of the cylindrical main body; and a second part coupled to the discharge opening, the second part provided with an opening and first and second seals on opposite sides of the opening, the first seal forming a seal with an inside surface of the cylindrical main body of the first part between the upper end of the slot and the second axial end of the cylindrical main body, and the second seal forming a seal with an inside surface of said collar, wherein said second part includes a lower portion of constant diameter coupled to the discharge opening, a pair of inclined arms extending toward each other and away from said lower portion, and a disc supported by said arms distant said lower portion, said disc extending in a plane transverse to an axis of said lower portion, said first seal being provided circumferentially about said lower portion and said second seal being provided circumferentially about said disc; and an air bleed passage enabling fluid communication between said cavity and atmosphere and an air bleed valve for selectively opening and closing said air bleed passage, the air bleed passage having a first opening that opens onto an undersurface of the lid.

2. The lid according to claim 1 wherein the air bleed passage has a second opening that opens onto said cavity and said air bleed valve includes a biased seal normally biased to seal the second opening and connected with a manually operable actuator.

3. The lid according to claim 2 wherein the biased seal is connected to the actuator via an elongated pin and the actuator is in the form of a button that can be depressed to open the biased seal against bias of the biased seal to allow air to bleed into the container to which the lid is attached via the air bleed passage.

4. The lid according to claim 3 further comprising a handle, the handle being adapted to allow the container to be carried and manipulated when the lid is attached to the container.

5. The lid according to claim 4 wherein the actuator is disposed in said handle to allow the air bleed valve to be operated by a hand gripping the handle.

6. A dispensing lid for gravity feed dispensing of a liquid from a container, the lid comprising:

a main body defining a cavity and having coupling means for releasably attaching the lid to the container;

a spout extending from the main body, the spout having an outer surface on which is provided a pin and a discharge opening at a distal end; and an adjustable discharge valve coupled to the spout for varying the flow rate of liquid through the spout, the adjustable discharge valve including a first part comprising a sleeve having a cylindrical main body with first and second opposite axial ends; a tapered portion continuous with the second axial end and reducing in diameter away from the first axial end, and a collar of constant diameter extending from and formed contiguously with the tapered portion, with an inclined through slot formed in the cylindrical main body and in which said pin resides, the through slot having an upper end axially spaced from the second axial end of the cylindrical main body; and a second part coupled to the discharge opening, the second part provided with an opening and first and second seals on opposite sides of the opening, the first seal forming a seal with an inside surface of the cylindrical main body of the first part between the upper end of the through slot and the second axial end of the cylindrical main body, and the second seal forming a seal with an inside surface of said collar, wherein said second part includes a lower portion of constant diameter coupled to the discharge opening, a pair of inclined arms extending toward each other and away from said lower portion, and a disc supported by said arms distant said lower portion, said disc extending in a plane transverse to an axis of said lower portion, said first seal being provided circumferentially about said lower portion and said second seal being provided circumferentially about said disc; and an air bleed passage enabling fluid communication between said cavity and the atmosphere and an air bleed valve for selectively opening and closing said air bleed passage.

7. The lid according to claim 6 wherein the air bleed passage has a first opening that opens onto an undersurface of the lid.

8. The lid according to claim 7 wherein the air bleed passage has a second opening that opens onto said cavity and said air bleed valve includes a biased seal normally biased to seal the second opening and connected with a manually operable actuator.

9. The lid according to claim 8 wherein the biased seal is connected to the actuator via an elongated pin and the actuator is in the form of a button that can be depressed to open the seal against the bias to allow air to bleed into the container to which the lid is attached via the air bleed passage.

10. The lid according to claim 9 wherein the lid further comprises a handle, the handle being adapted to allow the container to be carried and manipulated when the lid is attached to the container.

11. The lid according to claim 10 wherein the actuator is disposed in said handle to allow the air bleed valve to be operated by a hand gripping the handle.

* * * * *